United States Patent [19]

Halmann et al.

[11] 4,139,502
[45] Feb. 13, 1979

[54] NICKEL SELECTIVE DIOXIME-CONTAINING POLYURETHANE FOAMS

[75] Inventors: Martin M. Halmann, Rehovot, Israel; Dai-Woon Lee, Seoul, Rep. of Korea

[73] Assignee: Yeda Research and Development Company, Ltd., Rehovot, Israel

[21] Appl. No.: 845,236

[22] Filed: Oct. 25, 1977

[30] Foreign Application Priority Data

Oct. 26, 1976 [IL] Israel ............................................ 50769

[51] Int. Cl.² ................................................ B01D 15/08
[52] U.S. Cl. ...................................... 423/139; 521/29; 521/55; 210/38 B
[58] Field of Search .......... 260/2.5 A, 2.5 AL, 2.2 R; 423/139, 311; 75/119

[56] References Cited

U.S. PATENT DOCUMENTS 3,957,504  5/1976  Ho et al. ............................... 75/119

FOREIGN PATENT DOCUMENTS 1111834  7/1961  Fed. Rep. of Germany ............. 75/119

OTHER PUBLICATIONS

Talanta, vol. 22, No. 8, pp. 699–705, 1975, Aug., Regaman Press, Great Britain Braun et al.
Talanta, vol. 22, pp. 453–458, (1975), D. C. Gregoire et al.

*Primary Examiner*—Joseph L. Schofer
*Assistant Examiner*—Peter F. Kulkosky
*Attorney, Agent, or Firm*—Browdy and Neimark

[57] ABSTRACT

Extraction means for the selective extraction of nickel from aqueous solutions thereof, being an open-pore polyurethane foam supporting in its matrix a dioxime of the general formula

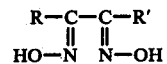

wherein R and R' each designate an alkyl, aryl, aralkyl, alkaryl or a heterocyclic group, which may be substituted by a non-interfering substituent, or R and R' may form together a ring-structure so as to form cyclohexanedione glyoxime; optionally together with a plasticizer.

11 Claims, No Drawings

NICKEL SELECTIVE DIOXIME-CONTAINING POLYURETHANE FOAMS

SUMMARY OF THE INVENTION

The invention relates to novel means for the selective removal of nickel ions from aqueous solutions thereof, said means comprising an open-pore polyurethane foam supporting in its matrix a chelating agent of the formula R—C(=NOH)—C(=NOH)-R', wherein R and R' each designate an alkyl, aryl, aralkyl, alkaryl or heterocyclic group, which may be substituted by non-interfering substituents, or R and R' may form together a ring-structure so as to result in a cyclohexandione glyoxime molecule, said extractant optionally also containing a suitable quantity of plasticizer. Amongst suitable substituents R and R' there may be mentioned alkyl groups such as methyl, ethyl, propyl, isopropyl, butyl, isobutyl; groups such as phenyl, cyclohexyl, furyl and the like. When the open-pore polyurethane is imbued with the glyoxime together with a plasticizer, the stability of the glyoxime supported by the polymer matrix is enhanced. Suitable plasticizers are phthalate esters, long-chain aliphatic esters and trialkyl phosphates. Especially advantageous results were obtained with tributyl phosphate. The nickel is recovered from the resin by washing with a dilute mineral acid, and this regenerates the resin for further use. Good results were obtained, for example, with 1N to 5N aqueous hydrochloric acid.

According to a preferred embodiment of the present invention, the chelating agent is dissolved in an organic solvent, and preferably in a polar nonaqueous solvent, the polymer foam is imbued with this solution and the polymer supporting the required quantity of the chelating agent is dried. Foams of this type are able to support varying quantities of the chelating agents, and it is possible to incorporate about up to 10 weight percent of the chelating agent, calculated on the dry weight of the foam.

FIELD OF THE INVENTION

Selective removal of nickel ions from aqueous solutions is needed in the production of nickel from its ore as a stage in the hydrothermal processes of leaching. Thus, e.g. in the concentration of nickel from pentlandite $(Ni,Fe)_9S_8$, the ore is leached with an aerated ammoniacal solution which dissolves the nickel, cobalt, and copper sulfides as ammono-complexes, while iron oxide remains insoluble. In further stages of separation copper is precipitated, and the cobalt and nickel salts are oxidized to sulfamates. Hydrogenation of this solution at elevated pressure and temperature causes the reduction and precipitation of metallic nickel. Waste water, polluted with nickel, is derived from industrial and municipal effluents. e.g. from nickel-plating operations. Nickel, as well as other heavy metal ions, have been shown to have toxic effects not only on the human body, but also on the growth and reproduction of various plants (A. J. Rubin, "Aqueous-Environmental Chemistry of Metals", Ann Arbor Science Publ. Inc., 1974). The average concentration of nickel in domestic sewage water (in the U.S.A.) is 1–2 mg/l. This nickel content is not removed by primary or secondary treatment, and the final effluent of treatment plants still contains the same concentration of nickel. For drinking or irrigation waters the recommended maximum concentration (U.S. standards) is 0.2 mg/l. The growth of the fresh water alga Scenedesmus was shown to be severely inhibited by nickel ion concentrations of 0.5 to 0.75 ppm, with a synergistic effect due to the presence of both nickel and copper (P. Stokes, Verh, Internat, Verein Limnol., 19, 2128–2137 (1975)). Toxic effects of nickel to agricultural crops treated with sludge were noticed at concentrations of 20 to 35 ppm, for potatoes and oats, respectively (R. E. Brown, J. Water Poll. Contr. Fed., 47, 2863 (1975)).

Pollution with radioactive nickel-63 is a problem in the operation of nuclear reactors, in which corrosion of the nickel in structural steel releases $^{63}Ni$ (half-life 92 years) into cooling waters. Leakage of such contamination into the environment may cause its concentration in biological systems and hence may cause health hazards (I. S. Bhat, R. S. Iyer, and S. Chandramouli, Anal. Chem., 48, 224 (1976).

STATE OF THE PRIOR ART

Removal of various heavy metal pollutants has been achieved before either with ion exchangers (see, for example, J. E. Going, et al., Anal. Chim. Acta., 81, 349 (1976); R. G. Smith. Jr., Anal. Chem., 46, 607 (1974)) and controlled pore glass (e.g. K. H. Sugawara, et. al. Anal. Chem., 46, 489 (1974), D. E. Leydon and G. H. Luttrell, Anal. Chem. 47, 1612 (1975), or with solvent extraction methods (see for example D. F. Flett, M. Cox, and J. D. Heels, J. Inorg. Nucl. Chem., 37, 2533 (1975) or with open-pore polyurethane foams (see for example H. J. M. Bowen, J. Chem. Soc. (A), 1970, 1082; T. Braun and A. B. Farag, Talanta, 22, 699 (1975)). However, none of these separation media are both efficient and selective for nickel only.

BRIEF DESCRIPTION OF THE INVENTION

According to the present invention there is provided a novel agent for the extraction of nickel ions from aqueous solutions thereof. The nickel ions are selectively extracted from aqueous solutions thereof and can be separated from other ions such as ferrous iron, ferric iron, zinc, cadmium, cupric and cobalt ions. The novel means for the selective extraction of nickel ions consists of an open-pore polyurethane foam supporting a sufficient quantity of a chelating agent which is immobilized by the foam matrix. Various polymeric foams were examined, and it was found that polyurethane foams are especially suited for the intended purpose. The loading capacity of foamed silicon rubber is, for example, lower than that of polyurethane foams by a factor of about 50. The novel extraction agent is suited for the removal of nickel ions down to very low concentrations. Advantageously the polymer is imbued with the extraction agent together with a suitable plasticizer.

The novel extractant according to the present invention is a polyurethane foam matrix supporting a chelating agent of the formula

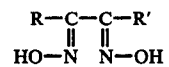

wherein R and R' are each an alkyl, aryl, aralkyl, alkaryl or heterocyclic group, or R and R' form together a ring structure so as to form a cyclohexanedione glyoxime molecule.

The new nickel-selective extractants may be prepared in a number of ways. They may be prepared by the polycondensation of diisocyanates (e.g. diphenylmethanediisocyanate) with polyols containing α-dicarbonyl groups, to produce cellular polyurethane plastics which then by reaction with hydroxylamine hydrochloride form the polymeric dioxime. However, the preferred method for the preparation of the nickel-selective polymer foam, according to the present invention comprises treating a standard commercial flexible open-pore polyurethane foam with a low molecular weight dioxime under conditions which ensure incorporation of the chelating agent within, as well as on the surface of the polymeric matrix.

According to the preferred method, this incorporation is effected in a polar nonaqueous solvent, such as methanol, ethanol, acetone, dimethylformamide, dimethylsulfoxide or dioxane, and the polymer foam is subsequently carefully dried, resulting in a stable matrix supporting the chelating agent. According to a preferred embodiment the extractant is applied together with a plasticizer.

The extraction of nickel from aqueous solutions using the nickel-selective foam may be carried out either by a batch method; i.e., by shaking the solution to be treated with the foam or by continuous elution; i.e., by packing the foam into a suitable column and by letting the solution flow through the column.

DESCRIPTION OF THE PFEFERRED EMBODIMENT

The following examples are illustrative of the process and products of the present invention but are not to be construed in a limiting sense. All parts and percentages are by weight.

EXAMPLE 1

Standard commercial flexible polyurethane foam (density: 200 kg/m$^3$ cut into cubes of about 5 mm edge, or into cylinders of 1.7 cm diameter and to 3 to 6 cm length) was washed with 1M hydrochloric acid, followed by deionized water until washings were free of chloride ions. The foam was washed with acetone to remove any organic impurities and dried at 70-80° C. The dried foam (1 part) was shaken with 150 parts of a 1.5-3 percent solution of dimethylglyoxime in acetone for 0.5 to 1 hour to ensure complete saturation. The treated foam was then dried at room temperature under vacuum to remove the acetone. The content of dimethylglyoxime in the treated foam, as determined by extraction with ethanol and measurement of its ultraviolet absorption at 226 nm, was about 8 parts of dimethylglyoxime per 100 parts of foam.

This foam was used in a batch process. An aqueous, neutral or slightly alkaline solution (pH 7-10, 100 to 200 parts) containing nickel was shaken mechanically with the above treated foam cubes (0.5 to 1 part) for 20 to 60 minutes. Quantitative (better than 98%) adsorption of the nickel ions on the foam was achieved with solutions containing 1-5 ppm nickel, while 90% adsorption was obtained with 0.5 ppm nickel. The adsorption of nickel was unaffected by temperature in the range of 19-58° C. In the elution method cylindrically cut foam plugs were packed into columns. At flow rates of 0.5-1 ml min$^{-1}$, at an optimal pH of 8-10, the retention of nickel from solutions initially 20, 5, and 2 ppm nickel was 98-99, 97, and 79%, respectively. The capacity of the treated foam column for more concentrated nickel solutions (above 100 ppm) was determined by the frontal method: the breakthrough capacity was 15 parts of nickel per 1000 parts of treated foam, supporting $6.8 \times 10^{-1}$ mmole dimethylglyoxime per gram foam.

Quantitative recovery of the nickel (96-98%) from the foam was achieved by elution with 3N hydrochloric acid. Such a washing eluted about 90% of the dimethylglyoxime content of the foam which, however, could be reloaded by treatment as above.

EXAMPLE 2

An extractant was prepared according to Example 1, but using a saturated solution of α-benzildioxime in DMSO instead of dimethylglyoxime. The foam with immobilized α-benzildioxime had an improved sensitivity for low concentrations of nickel, resulting in quantitative removal of nickel even at 0.5 ppm concentrations. Recovery of adsorbed nickel from the foam by elution with 5N hydrochloric acid did not cause any appreciable loss of α-benzildioxime from the foam (less than 5%) indicating that the reuse of the treated foam was possible. The content of α-benzildioxime in the foam matrix was about 3 parts of α-benzildioxime per 100 parts of foam. The breakthrough capacity was 3 parts of nickel per 1000 parts of treated foam.

EXAMPLE 3

An open-pore polyurethane foam of 25 kg/m$^3$ (1 part) was charged with a solution of 0.5 parts dimethylglyoxime, 20 parts tri-n-butyl-phosphate and 100 parts acetone, and the foam was shaken in this solution for 2 hours. After this period of time the foam was dried under vacuum for 1 hour and a column was charged with this foam as set out in Example 1.

An aqueous solution of pH 8.5 containing 7 ppm nickel was passed through a column of 2 cm diameter, and 15 cm height, at a rate of flow of 5 ml per minute. The effluent contained less than 0.05 ppm nickel and thus the retention by the resin was better than 99%. When more concentrated solutions of nickel were passed through the column, a similar degree of removal was obtained. The capacity of the resin was about 18 parts (by weight) of nickel per 1000 parts by weight of the extractant foam. The nickel was recovered from the foam by washing with 1 N hydrochloric acid. The recovery was quantitative and the column could be used for further extractions. The loss of glyoxime until exhaustion from the column was less than 10 percent of the glyoxime.

A similar run was carried out but the resin was imbued with a 3 percent by weight solution of dimethylglyoxime in tributyl phosphate. An excess of this solution was used and the polymer foam was imbued with this solution and excess was squeezed out. The thus obtained resin was used as in the foregoing run and similar results were obtained.

We claim:

1. An extraction agent for the selective extraction of ions of nickel from aqueous solutions containing same, comprising a dioxime of the formula

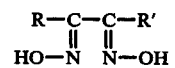

wherein R and R' each designates alkyl, aryl, aralkyl, alkaryl or a heterocyclic group, optionally substituted by a non-interfering substituent, which dioxime is supported in the matrix of an open-bore polyurethane foam.

2. An extraction agent according to claim 1, wherein the substituents R and R' are lower alkyl, phenyl or cyclohexyl groups.

3. An extraction agent according to claim 1 wherein the quantity of dioxime supported by the polymeric matrix comprises from 1 to 10 weight percent calculated on the polymer.

4. An extraction agent according to claim 1 wherein the polymer is an open-pore flexible or rigid polyurethane foam of from 100 kg to 300 kg/m$^3$ weight.

5. An extraction agent according to claim 1, further including a plasticizer selected from the group consisting of phthalate esters, long chain aliphatic esters, and trialkyl phosphates.

6. A process for the selective removal of nickel ions from aqueous solutions thereof which may also contain other metal ions, which comprises contacting the solution with an extraction agent according to claim 1, and eluting the selectively extracted nickel by means of a dilute aqueous mineral acid.

7. A process according to claim 6, wherein the pH of the solution is from neutral to slightly alkaline.

8. A process according to claim 6, wherein the process is effected batchwise.

9. A process according to claim 6, wherein the process is effected in a continuous manner by passing the solution through a column of the extraction agent.

10. An extraction agent according to claim 1 wherein said dioxime is α-benzildioxime.

11. A process in accordance with claim 6 wherein said dioxime is α-benzildioxime.